(12) United States Patent
Berkey et al.

(10) Patent No.: US 12,728,475 B2
(45) Date of Patent: Sep. 8, 2026

(54) METHODS FOR METAL FLOW REACTOR MODULES AND MODULES PRODUCED

(71) Applicant: CORNING INCORPORATED, Corning, NY (US)

(72) Inventors: George Edward Berkey, Pine City, NY (US); Richard Alan Quinn, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 969 days.

(21) Appl. No.: 17/914,085

(22) PCT Filed: Mar. 29, 2021

(86) PCT No.: PCT/US2021/024601
§ 371 (c)(1),
(2) Date: Sep. 23, 2022

(87) PCT Pub. No.: WO2021/202348
PCT Pub. Date: Oct. 7, 2021

(65) Prior Publication Data

US 2023/0150050 A1 May 18, 2023

Related U.S. Application Data

(60) Provisional application No. 63/003,273, filed on Mar. 31, 2020.

(51) Int. Cl.
*B01J 19/24* (2006.01)
*B23K 20/02* (2006.01)
(Continued)

(52) U.S. Cl.
CPC ............ *B23K 20/02* (2013.01); *B01J 19/249* (2013.01); *B23K 20/24* (2013.01);
(Continued)

(58) Field of Classification Search
CPC .... B23K 20/02; B23K 20/24; B23K 35/3602; B23K 20/023; B23K 20/021; B23K 20/16;
(Continued)

(56) References Cited

U.S. PATENT DOCUMENTS

2002/0071797 A1 6/2002 Loffler et al.
2004/0258572 A1* 12/2004 Haibara ............... B01J 19/0093 422/400

(Continued)

FOREIGN PATENT DOCUMENTS

CN 101184574 A 5/2008
CN 205482443 U 8/2016

(Continued)

OTHER PUBLICATIONS

Machine translation of JP-2001223309 A (Year: 2026).*

(Continued)

*Primary Examiner* — Huy Tram Nguyen

(57) ABSTRACT

A method for forming a metal flow module includes stacking together a first metal plate having opposing first and second major surfaces and one or more flow channels defined at least in part in the first major surface with a second metal plate having opposing first and second major surfaces, the plates stacked together with their respective first major surfaces facing each other and with a layer of flux positioned in between contacting portions of the respective first major surfaces defined as those portions of the respective first and second major surfaces which would be in contact absent the flux; then heating the plates together in a non-oxidizing atmosphere to thermally bond the contacting portions of the respective first major surfaces of the first and second metal plates. Resulting modules are also disclosed.

16 Claims, 3 Drawing Sheets

(51) Int. Cl.

| | |
|---|---|
| ***B23K 20/16*** | (2006.01) |
| ***B23K 20/24*** | (2006.01) |
| ***B23K 35/36*** | (2006.01) |

(52) U.S. Cl.
CPC ... *B23K 35/3602* (2013.01); *B01J 2219/2486* (2013.01); *B01J 2219/2493* (2013.01)

(58) Field of Classification Search
CPC .............. B01J 19/249; B01J 2219/2486; B01J 2219/2493; B01J 19/0093; B01J 2219/00783; B01J 2219/2453
USPC .......................................................... 422/198
See application file for complete search history.

(56) References Cited

U.S. PATENT DOCUMENTS

| | | | | |
|---|---|---|---|---|
| 2006/0225347 | A1 | 10/2006 | Lee et al. | |
| 2008/0190595 | A1 | 8/2008 | Sjodin et al. | |
| 2009/0151917 | A1 | 6/2009 | Meschke et al. | |
| 2010/0276473 | A1 | 11/2010 | Hagen et al. | |
| 2012/0095268 | A1 | 4/2012 | Tonkovich et al. | |
| 2012/0160084 | A1 * | 6/2012 | Mosser ................ | B23K 20/023 89/917 |
| 2015/0034286 | A1 | 2/2015 | Sjdin et al. | |
| 2016/0067671 | A1 | 3/2016 | Guidat et al. | |
| 2022/0212295 | A1 | 7/2022 | Sjdin et al. | |

FOREIGN PATENT DOCUMENTS

| | | | | | |
|---|---|---|---|---|---|
| CN | 103338852 | B | | 11/2016 | |
| CN | 104203489 | B | | 4/2018 | |
| CN | 109827451 | A | | 5/2019 | |
| CN | 111390427 | A | | 7/2020 | |
| CN | 212189044 | U | | 12/2020 | |
| EP | 1123734 | B1 | | 7/2008 | |
| JP | 62-081280 | A | | 4/1987 | |
| JP | 2000-311932 | A | | 11/2000 | |
| JP | 2001-030086 | A | | 2/2001 | |
| JP | 2001223309 | A | * | 8/2001 | ......... F28D 15/0233 |
| JP | 2009-172672 | A | | 8/2009 | |
| KR | 100888363 | B1 | * | 3/2009 | ............. B23K 31/02 |
| KR | 10-2014-0020305 | A | | 2/2014 | |
| TW | 202043152 | A | | 12/2020 | |
| WO | 2021/202348 | A1 | | 10/2021 | |
| WO | 2022/047126 | A1 | | 3/2022 | |

OTHER PUBLICATIONS

Machine translation of KR-100888363 B1 (Year: 2026).*

Chinese Patent Application No. 202180026175.8 , Office Action dated Nov. 26, 2025, 5 pages (English Translation only), Chinese Patent Office.

Extended European Search Report, EP Patent application No. 21781326.0; dated Apr. 29, 2024, 7 pages, European Patent Office.

International Search Report and Written Opinion of the International Searching Authority; PCT/US2021/024601; dated Jun. 30, 2021; 10 pages; European Patent Office.

* cited by examiner

Figure 1:
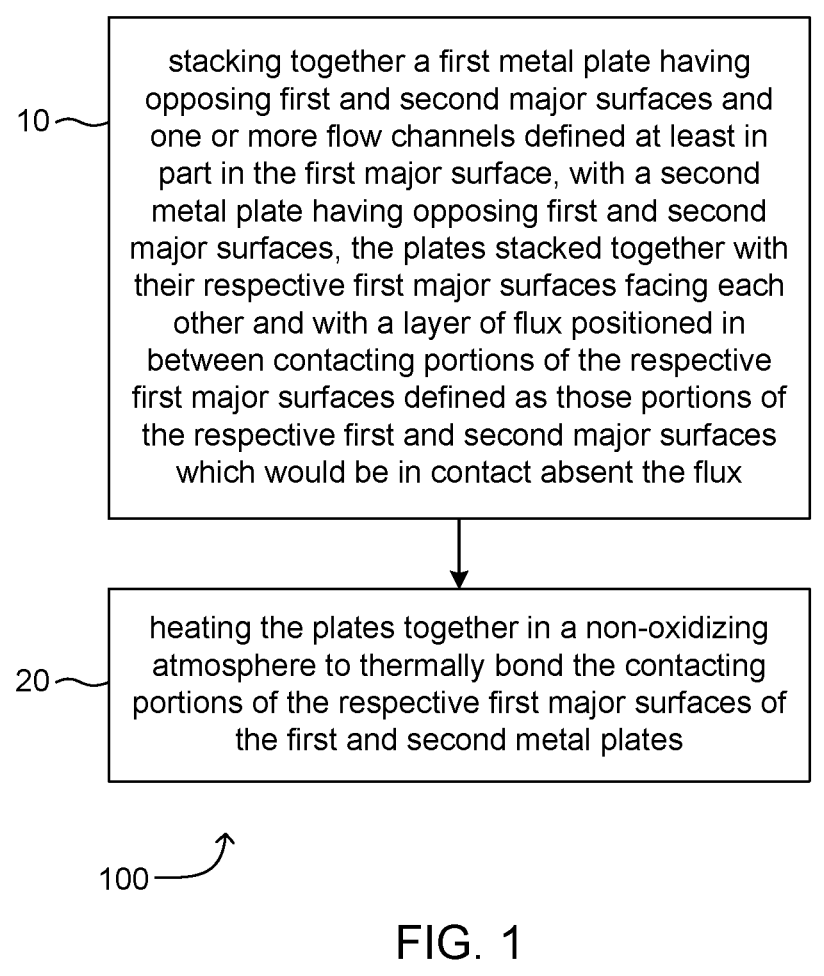

10 — stacking together a first metal plate having opposing first and second major surfaces and one or more flow channels defined at least in part in the first major surface, with a second metal plate having opposing first and second major surfaces, the plates stacked together with their respective first major surfaces facing each other and with a layer of flux positioned in between contacting portions of the respective first major surfaces defined as those portions of the respective first and second major surfaces which would be in contact absent the flux 20 — heating the plates together in a non-oxidizing atmosphere to thermally bond the contacting portions of the respective first major surfaces of the first and second metal plates

METHODS FOR METAL FLOW REACTOR MODULES AND MODULES PRODUCED

CROSS-REFERENCE TO RELATED APPLICATIONS

This application claims the benefit of priority under 35 U.S.C. § 371 of International Application No. PCT/US2021/024601, filed on Mar. 29, 2021, which claims the benefit of priority under 35 U.S.C. § 119 of U.S. Provisional Application No. 63/003,273 filed Mar. 31, 2020, the content of each of which is incorporated herein by reference in its entirety.

FIELD OF THE DISCLOSURE

The disclosure relates to methods for producing metal flow modules useful in flow reactors, and more particularly to efficient, low cost methods of producing metal flow modules, particularly stainless steel flow modules featuring enclosed through-passages in a stainless steel module body.

BACKGROUND

Large surface-to-volume ratio offered by micro- and milli-meter and even smaller centimeter scale channel geometries can intensify mass and heat transfer, often reducing reaction times to seconds instead of minutes or hours compared to conventional batch processing. The intensification serves to increase the reaction rate and thus increase the rate of product synthesis per reaction volume. Continuous flow reactors employing such channels have found increasingly wide applications in organic synthesis on all scales as well as in other chemical processing applications.

Rapidly growing interest can be attributed to a range of advantages offered by such devices. Compared to traditional batch reactors, continuous flow reactors employing modules with micro- and milli-meter scale—or even small centimeter scale channels—typically exhibit enhanced heat and mass transfer, improved safety, and higher levels on controllability. Furthermore, multiple reaction steps, purification steps and analysis can often be combined into a single continuous production unit.

Flow systems are usually assembled from relatively simple, off-the-shelf components, such as polymer or metal tubing in combination with standard connectors to join the flow reactor modules together. These components, which are readily available and cheap, allow only limited design complexity for process intensification applications, particularly where intense mass transfer or heat exchange is desired. More elaborate channel architectures can be provided within flow reactor modules. Several structural elements, such as mixing structures, residence time channels, separation units and interfaces for in-line analysis, have been incorporated into these devices.

Flow reactor modules are commercially available in various pre-determined designs formed in various inert materials (most commonly glass, stainless steel/Hastelloy metal, or silicon carbide ceramic). The modules may be manufactured by various techniques, such as micromachining, laser ablation, etching, laser sintering, and molding—methods which are not particularly low cost. One relatively low cost manufacturing method is to machine channels into one or two mating surfaces of cooperating metal plates, then seal mating surfaces of the plates together with a compressed elastomeric gasket. While relatively low cost, this approach has inherent limits on operating temperatures and pressures. A lower cost method of manufacturing high performance flow reactors is desirable.

SUMMARY OF THE DISCLOSURE

According to some aspects of the present disclosure, A method for forming a metal flow module, the method comprising stacking together a first metal plate having opposing first and second major surfaces and one or more flow channels defined at least in part in the first major surface, with a second metal plate having opposing first and second major surfaces, the plates stacked together with their respective first major surfaces facing each other and with a layer of flux positioned in between contacting portions of the respective first major surfaces defined as those portions of the respective first and second major surfaces which would be in contact absent the flux; and heating the plates together in a non-oxidizing atmosphere to thermally bond the contacting portions of the respective first major surfaces of the first and second metal plates.

In embodiments, the second metal plate can also have one or more flow channels defined at least in part in the first major surface thereof.

In embodiments, the flux comprises a carbide or nitride powder. A carbide powder or a carbide powder mixture is most preferred, specifically one comprising boron carbide.

In embodiments, heating the plates is performed while pressing the plates together. Alternatively, the plates can be mechanically fastened together prior to heating the plates, such as by joining the plates with screws or bolts around the perimeter thereof, or both around the perimeter thereof and in selected locations in the middle or center.

In embodiments, at least portions of the first major surfaces of the first and second plates can be coated with a chemically resistant coating prior to stacking the plates together. The portions correspond, defined as align to, to locations of the flow channels. Alternatively, after heating the plates together in a non-oxidizing atmosphere to thermally bond the contacting portions of the respective first major surfaces of the first and second metal plates, the flow channels can then be coated with a chemically resistant coating. In either case, a carbide coating, preferably silicon carbide, is desirable.

In embodiments, the method further comprises forming in the first major surface of the first plate the one or more flow channels defined at least in part in the first major surface, such as by machining.

In other embodiments, a flow module useful in a flow reactor or for other fluidic processing is provided, the flow module comprising a first metal plate having opposing first and second major surfaces and one or more flow channels defined at least in part in the first major surface and a second metal plate having opposing first and second major surfaces, the plates joined together with their respective first major surfaces facing each other by a flux bond.

In still another embodiment, a flow module useful in a flow reactor or for other fluidic processing is provided, the flow module comprising a first metal plate having opposing first and second major surfaces and one or more flow channels defined at least in part in the first major surface and a second metal plate having opposing first and second major surfaces, the plates joined together with their respective first major surfaces facing each other by flux-assisted interdiffusion and/or co-melting of the facing surfaces.

The methods and modules of the present disclosure produced provide a low-cost method to produce a metal or stainless steel flow reactor module. If embedded fluid couplers are included, users have a simple way of connecting to the module, and the process of embedding is likewise simple and produces a robust seal between the couplers and the consolidated plate. The methods and modules also provide a flow reactor module which is sealed or enclosed without the use of organic materials such as gaskets or O-rings, allowing for performance high temperature processes or reactions, or other processes or reactions incompatible with organic materials.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 1 is flow diagram illustrating steps optional steps of embodiments of the present disclosure;

DETAILED DESCRIPTION OF THE PREFERRED EMBODIMENTS

Figure 2:
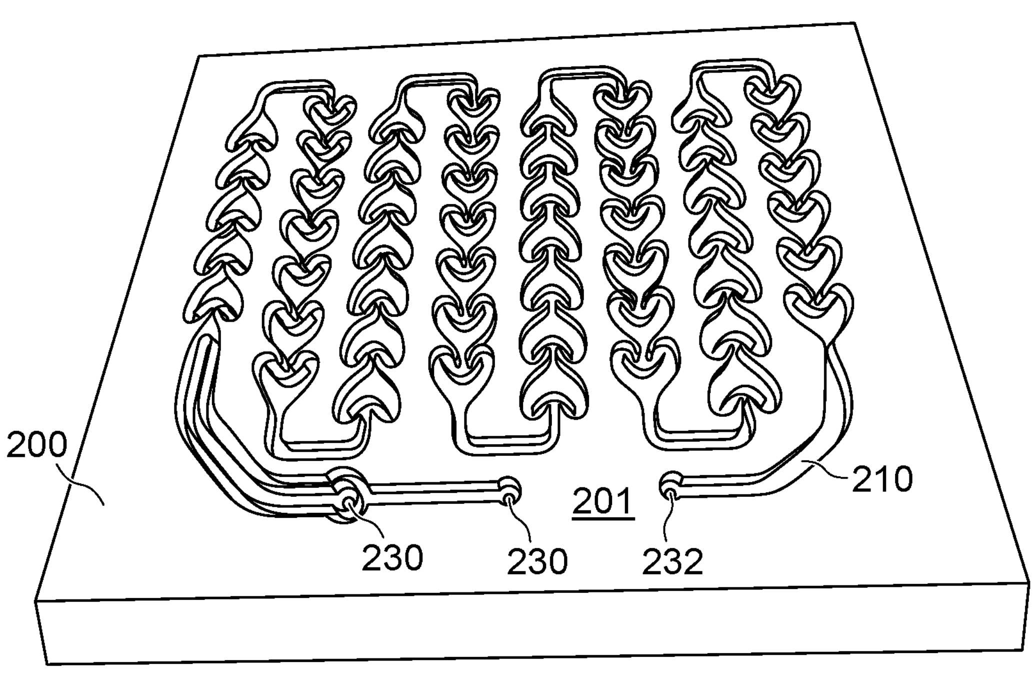
FIG. 2 is a digital photograph of an embodiment of a metal plate according to aspects of the current disclosure, the plate having one or more channels machined therein.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, a "tortuous" passage refers to a passage having no line of sight directly through the module and with the central path of the passage tracing more than one radius of curvature, such that typical machining-based forming techniques are generally inadequate to form such a passage.

With reference to FIG. 1, a method 100 is represented in the flow diagram of the figure, the method comprising the step 10 of stacking together a first metal plate having opposing first and second major surfaces and one or more flow channels defined at least in part in the first major surface, with a second metal plate having opposing first and second major surfaces, the plates stacked together with their respective first major surfaces facing each other and with a layer of flux positioned in between contacting portions of the respective first major surfaces defined as those portions of the respective first and second major surfaces which would be in contact absent the flux.

The presently preferred metal for the plates is 316L stainless steel, which has high corrosion performance and is readily available various thicknesses and sizes. Other stainless steel metals can be used as well including hastalloy, as well as still other metals.

The method further comprises the step 20 of then heating the plates together in a non-oxidizing atmosphere to thermally bond the contacting portions of the respective first major surfaces of the first and second metal plates.

The currently preferred flux is carbide powder for preserving chemical resistance of the finished modules. Any carbide powder (silicon carbide, boron carbide, hafnium carbide, etc.), or mixtures thereof, can be used. The preferred fluxing agent for lower sealing temperature is boron carbide as the bonding temperature (approximately 1210° C.) is significantly lower than other carbide powders (for example, silicon carbide requires a flux temperature of approximately 1340° C.). The carbide powder or carbide powder mixture is merely sprinkled onto the first surface of one of the plates so that there is complete coverage. It has been found that some nitride powders (silicon nitride) can bond as well, but carbide powder flux has better corrosion resistance relative to nitrides. The flux bonding process requires that it take place in an non-oxidizing or in an inert atmosphere (argon, vacuum, etc.). For carbide powders the bonding process can adequately take place in 90 minutes at peak temperature (for boron carbide that is 1210° C.).

According to embodiments of the method, the second metal plate can also have one or more flow channels defined at least in part in the first major surface thereof.

According to embodiments, the heating step can be performed while pressing the plates together, although it can also be successful without external pressing. As the plates become relatively larger, however, it is currently preferred to mechanically fasten the plates together prior to heating, such as by joining the plates with screws or bolts positioned around the perimeter thereof.

FIG. 2 shows a plate 200 for use in the disclosed method. The plate is stainless steel with a channel 210 formed in a first major surface 201 of the plate, such as by machining. A second major surface 202 of the plate 200, the surface 202 not being directly visible in the photograph of FIG. 2, is positioned opposite the first major surface 201. The channel 210 has two inputs 230 and an output 232.

Figure 3:
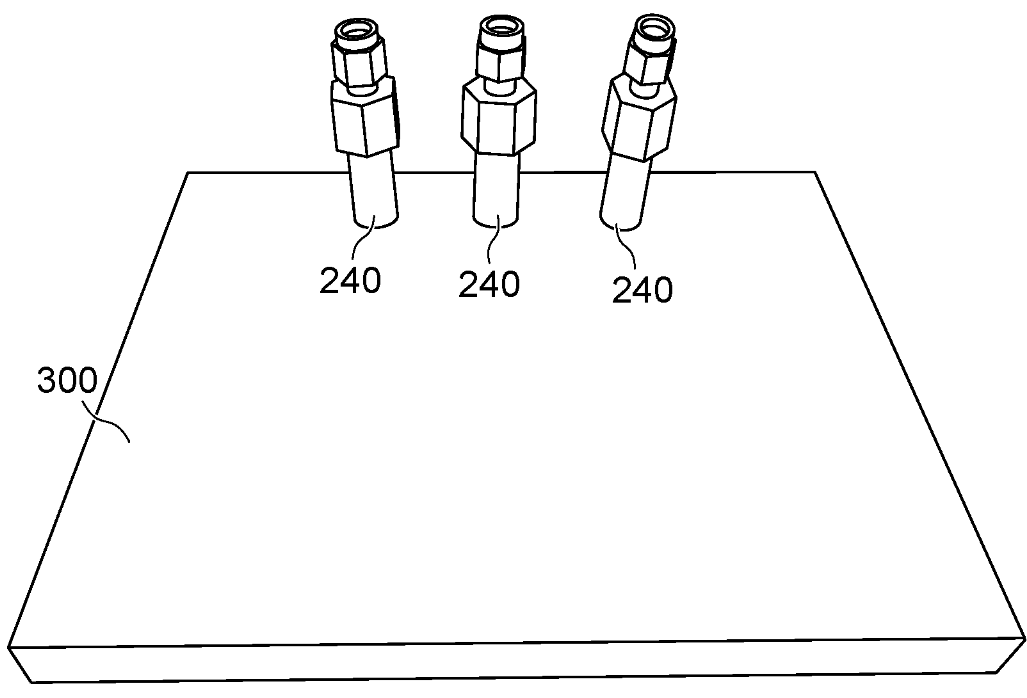
FIG. 3 is a digital photograph of an embodiment of a flow module according to aspects of the present disclosure.

FIG. 3 shows a finished (sealed) module 300 after the heating step. Metal fluid connectors 240 have been added.

Figure 4:
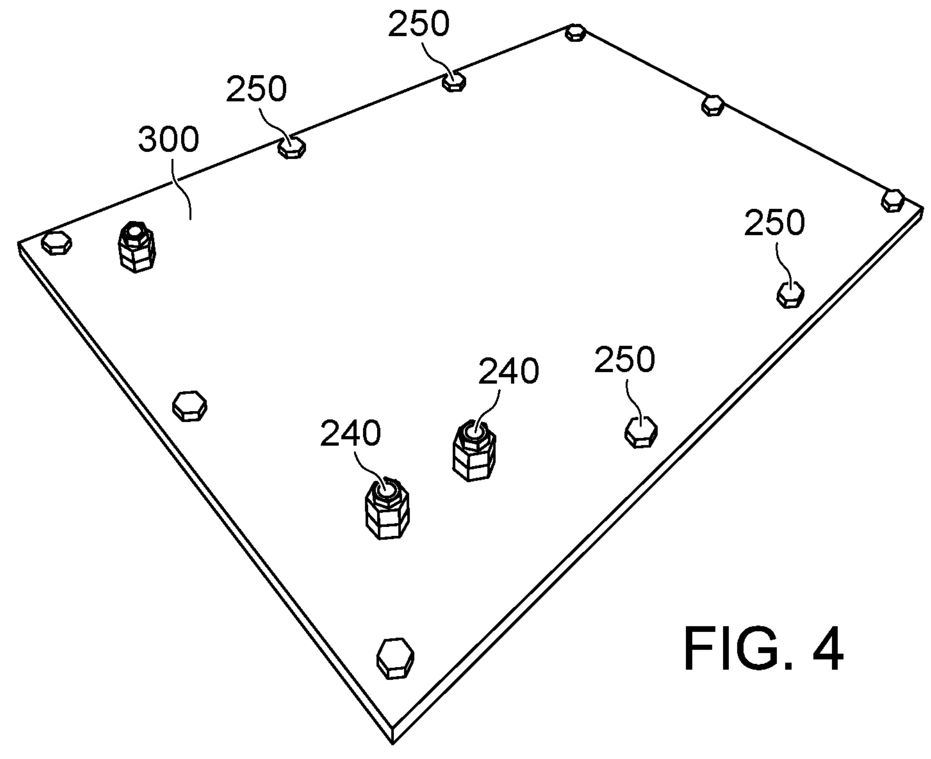
FIG. 4 is a digital photograph of another embodiment of a flow module according to aspects of the present disclosure.

FIG. 4 shows another finished (sealed) module 300 after the heating step. Bolts were used at locations around the perimeter of the module 300 to hold the first and second plates together and prevent warping or separation during heating. Metal fluid connectors 240 have again been added.

According to another aspect of the present method, the threads of the fluid connectors 240 (such as Swagelok® fittings) used for fluid inputs and outputs can be coated with a flux material prior to threading them into the respective plate, prior to the heating step. This produces a permanent and durable seal between the fluid connectors 240 and the module 300. Without thermal flux-assisted bonding of the connectors into the plate, leaks can occur under high pressure. The flux for this purpose may take the form of a water based paint mixture including silicon carbide and boron carbide powder.

For some applications, additional corrosion resistance is needed even relative to stainless steel. For such applications, a carbide film (silicon carbide is preferred) can be first deposited on the open face of the milled channel plate prior to plate stacking and heating and bonding process. Alternatively, the channels within the finished module may be coated after heating and bonding.

As another aspect of the present disclosure, a flow module useful in a flow reactor or for other fluidic processing is provided, the flow module comprising a first metal plate having opposing first and second major surfaces and one or more flow channels defined at least in part in the first major surface and a second metal plate having opposing first and second major surfaces, the plates joined together with their respective first major surfaces facing each other by a flux bond.

As yet another aspect of the present disclosure, a flow module useful in a flow reactor or for other fluidic processing is provided, the flow module comprising a first metal plate having opposing first and second major surfaces and one or more flow channels defined at least in part in the first major surface and a second metal plate having opposing first and second major surfaces, the plates joined together with their respective first major surfaces facing each other by flux-assisted interdiffusion and/or co-melting of the facing surfaces.

Figure 5:
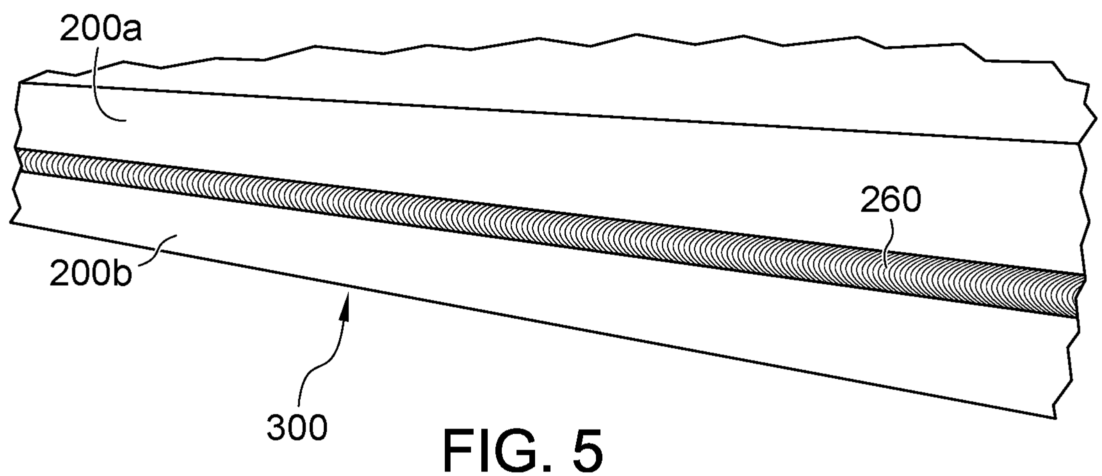
FIG. 5 is a close up digital photograph of an edge of an embodiment of a flow module according to aspects of the present disclosure showing a seal between first and second plates of the module.

FIG. 5 is a close up digital photograph of an edge of an embodiment of a flow module according to aspects of the present disclosure showing a seal between first and second plates **200*a*, 200*b*, of a module 300. As may be seen in the figure, flux-assisted interdiffusion and/or co-melting of the facing ("first") surfaces of the plates 200*a*, 200*b*, has occurred at the interface 260**, producing a robust seal.

The methods and modules of the present disclosure provide a low-cost method to produce a metal or stainless steel flow reactor module. If embedded fluid couplers are included, users have a simple way of connecting to the module, and the process of embedding is likewise simple and produces a robust seal between the couplers and the consolidated plate. The method also provides a flow reactor module which is sealed or enclosed without the use of organic materials such as gaskets or O-rings, allowing for performance high temperature processes or reactions, or other processes or reactions incompatible with organic materials.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A method for forming a metal flow module, the method comprising:

stacking together a first metal plate having opposing first and second major surfaces and one or more flow channels defined at least in part in the first major surface, with a second metal plate having opposing first and second major surfaces, the plates stacked together with their respective first major surfaces facing each other and with a layer of flux positioned in between contacting portions of the respective first major surfaces defined as those portions of the respective first and second major surfaces which would be in contact absent the flux;

heating the plates together with the flux already positioned therebetween in a non-oxidizing atmosphere or an inert atmosphere to thermally bond the contacting portions of the respective first major surfaces of the first and second metal plates, wherein the flux comprises a carbide or nitride powder.

2. The method of claim 1 wherein the second metal plate has one or more flow channels defined at least in part in the first major surface thereof.

3. The method of claim 1 wherein the flux comprises a carbide powder.

4. The method of claim 3 wherein the flux comprises boron carbide powder.

5. The method of claim 1 wherein heating the plates is performed while pressing the plates together.

6. The method of claim 1 further comprising mechanically fastening the plates together prior to heating the plates.

7. The method of claim 6 wherein mechanically fastening the plates together comprises joining the plates with screws or bolts around the perimeter thereof.

8. The method of claim 6 wherein mechanically fastening the plates together comprises joining the plates with screws or bolts positioned around the perimeter thereof.

9. The method of claim 6 wherein mechanically fastening the plates together comprises joining the plates with screws or bolts positioned at locations around the perimeter thereof and in the center thereof.

10. The method according to claim 1 also comprising coating at least portions of the first major surfaces of the first and second plates with a chemically resistant coating prior to stacking the plates together.

11. The method according to claim 10 wherein the portions correspond, defined as align to, to locations of the flow channels.

12. The method according to claim 1 also comprising, after heating the plates together in a non-oxidizing atmosphere or an inert atmosphere to thermally bond the contacting portions of the respective first major surfaces of the first and second metal plates, coating the flow channels with a chemically resistant coating.

13. The method of claim 1 further comprising forming in the first major surface of the first plate the one or more flow channels defined at least in part in the first major surface.

14. The method of claim 13 wherein forming is performed by machining.

15. The method of claim 1 further comprising:

applying flux to threads of a fluid connector prior to the heating, the fluid connector configured to fluidically communicate with the one or more flow channels;

threading the fluid connector into one of the first and second metal plates such that the flux is positioned between contacting portions of the threads of the fluid connector and the one of the first and second metal plates; and heating the fluid connector and the first and second metal plates in the non-oxidizing atmosphere or the inert atmosphere to thermally bond the contacting portions.

16. The method of claim 1, wherein at least one of the first metal plate or the second metal plate comprise a stainless steel.

* * * * *